(12) United States Patent
Leoni et al.

(10) Patent No.: US 10,677,733 B2
(45) Date of Patent: Jun. 9, 2020

(54) DEVICE FOR POSITIONING AND ISOLATING A SAMPLE IN A SEALED ENVIRONMENT

(71) Applicant: Thermo Scientific Portable Analytical Instruments Inc., Tewksbury, MA (US)

(72) Inventors: Andrew T. Leoni, Billerica, MA (US); Michael Bush, Arlington, MA (US); Wayne Minter, Peabody, MA (US); Neil P. Hagerty, Westford, MA (US); Artur Malinouski, Boston, MA (US)

(73) Assignee: Thermo Scientific Portable Analytical Instruments Inc., Tewksbury, MA (US)

( * ) Notice: Subject to any disclaimer, the term of this patent is extended or adjusted under 35 U.S.C. 154(b) by 70 days.

(21) Appl. No.: 15/947,055

(22) Filed: Apr. 6, 2018

(65) Prior Publication Data
US 2018/0292259 A1    Oct. 11, 2018

Related U.S. Application Data

(60) Provisional application No. 62/482,850, filed on Apr. 7, 2017.

(51) Int. Cl.
| | |
|---|---|
| *G01N 21/71* | (2006.01) |
| *G01N 21/13* | (2006.01) |
| *G01N 21/67* | (2006.01) |
| *G01J 3/443* | (2006.01) |

(52) U.S. Cl.
CPC ........... *G01N 21/718* (2013.01); *G01N 21/13* (2013.01); *G01N 21/67* (2013.01); *G01J 3/443* (2013.01); *G01N 2021/135* (2013.01); *G01N 2201/0221* (2013.01)

(58) Field of Classification Search
CPC ........ G01J 3/0267; G01J 3/443; G01N 21/67; G01N 21/13; G01N 21/718; G01N 2201/0221; G01N 2021/135
See application file for complete search history.

(56) References Cited

U.S. PATENT DOCUMENTS

| | | | |
|---|---|---|---|
| 4,561,777 A * | 12/1985 | Radziemski | ....... G01N 15/0618 356/318 |
| 5,955,886 A * | 9/1999 | Cohen | ................... G01N 27/70 250/324 |

(Continued)

*Primary Examiner* — Michael P LaPage
(74) *Attorney, Agent, or Firm* — Banner & Witcoff, Ltd.

(57) ABSTRACT

Devices and methods are disclosed that allow for analysis with simplified sample preparation. Of particular relevance is the analysis of wire samples (e.g., weld wires) using laser induced breakdown spectroscopy (LIBS) or optical emission spectrometry (OES). Representative devices can isolate a sample, such as in a sealed, inert environment in an analytical instrument. These devices may include first and second sample end attachments connected to a body, which has a connecting portion that may be configured for alignment with the face of the instrument. The body may also include a rotatable cap, and the sample end attachments may be joined to this cap (e.g., at opposite ends thereof) to allow adjustment of the angular position of the sample, relative to the connecting portion, which in use may be affixed to the instrument.

13 Claims, 6 Drawing Sheets

(56) References Cited

U.S. PATENT DOCUMENTS

| | | | |
|---|---|---|---|
| 8,174,691 B1* | 5/2012 | Horton | G01N 1/02 356/244 |
| 2011/0130725 A1* | 6/2011 | Velez-Rivera | A61M 5/165 604/257 |
| 2012/0000893 A1* | 1/2012 | Broude | B23K 26/032 219/121.69 |
| 2016/0018325 A1* | 1/2016 | Elsoee | G01J 3/443 356/51 |
| 2017/0333681 A1* | 11/2017 | Di Caprio | A61M 25/0102 |

* cited by examiner

DEVICE FOR POSITIONING AND ISOLATING A SAMPLE IN A SEALED ENVIRONMENT

FIELD OF THE INVENTION

The present invention relates to devices for the isolation and positioning of samples, as needed, for example, in the analysis of metal wire samples, for example using laser induced breakdown spectroscopy (LIBS) or optical emission spectroscopy (OES) in an inert (e.g., argon) environment.

BACKGROUND OF THE INVENTION

Analytical techniques are known in which a high energy plasma of a sample is first formed, which, upon cooling generates a characteristic emission spectrum. More specifically, during this cooling, electrons of atoms and ions at the excited electronic states of the plasma return to their lower energy or ground states, causing the emission of radiation at discreet wavelengths, corresponding to the changes in energy levels. Every element in the periodic table is associated with unique spectral emission lines that may be detected in the visible portion of the electromagnetic spectrum. Emitted light from plasma may therefore be collected and coupled with a spectrograph detector, which can use a diffraction grating to split this light and resolve the emission spectra for the elements in the sample. The intensity of each spectrum can be used to determine the concentration of each associated element.

In laser induced breakdown spectroscopy (LIBS), high temperature plasma formation occurs upon focusing a short-pulse laser beam onto the sample surface, such that a small quantity of the sample is ablated, or removed by both thermal and non-thermal transformations. In optical emission spectroscopy (OES), the discharge plasma is normally formed by the application of electrical energy, such as in the form of a spark generated between an electrode and the sample. OES, however, can also refer to methods using an inductively coupled plasma (ICP) as the excitation source, or otherwise direct-current arc discharge or glow discharge, rather than a spark discharge. Both LIBS and OES provide simple, reliable, and fast methods that are especially suitable for the analysis of metallic samples by resolving their component elements. Concentrations may be accurately determined over a wide range that extends down to parts per million (ppm) levels. For these reasons, LIBS and OES have found widespread applicability in metal-producing industries such as foundries and steel manufacturing.

One particular procedure of importance in the field of LIBS and OES is the analysis of metal wire samples, including weld wire that must consistently meet stringent composition standards to ensure its acceptable performance in fabrication operations. Conventional preparation of a weld wire sample involves using welding equipment to melt the wire, followed by cooling of the molten puddle and grinding to provide the appropriate material for testing. Both LIBS and OES require the sample to be maintained in an inert atmosphere, typically provided by argon gas, within the analysis chamber.

SUMMARY

Aspects of the invention are associated with the discovery of devices and methods that allow for analysis with simplified sample preparation, in which conventional steps such as melting and grinding may be omitted. Of particular relevance to such devices and methods is the analysis of wire samples (e.g., weld wires) using LIBS and OES.

Embodiments of the invention are directed to a device for isolating a sample, such as in a sealed, inert environment, for analysis by an analytical instrument. The device may be used to isolate and position the sample, such as a wire sample, and the device may be attached to an analysis device for analysis and then detached, as needed. Accordingly, the device is removable from a larger analysis instrument. The device may include first and second sample end attachments connected to a body, which comprises a connecting portion that may be configured for alignment with the face of the instrument. The body may also include a rotatable cap, and the sample end attachments may be joined to this cap (e.g., at opposite ends thereof) to allow adjustment of the angular position of the sample, relative to the connecting portion, which in use may be affixed to the instrument. By "rotatable cap" is meant that the cap can turn through at least some angle of rotation, but not necessarily through a complete rotation (360°). The rotatable cap may be used for fine adjustments of the angular or rotational position of the sample, such as for its positioning within the path of a laser beam emitted by the analytical instrument. The rotatable cap may therefore allow for rotation through an angle of only 30° or less, 10° or less, or even 5° or less. Independent of the angular (rotational) position of the sample, the device may be configured to spatially position the sample at a desired location relative to the analytical instrument, for example tangent to a sample plane, which may coincide with the plane of an abutting face of the instrument, with which the device is aligned.

Advantageously, a representative device can, in addition to allowing precise rotational and spatial positioning of the sample, seal the sample from the ambient environment (air). In this regard, the first and second sample end attachments can provide respective, first and second seals of a sealed environment as required for the analytical method. That is, these end attachments can form seals with the sample itself, such that a central portion of the sample, disposed between these end attachments, can be contained within one environment (e.g., the inert argon environment as needed in the analysis chamber of the instrument), whereas respective outer portions of the sample (external to the central portion) can be maintained in a different (e.g., ambient) environment. A third seal of the sealed environment may be formed by the connecting portion of the body, for example, between the rear surface of a plate of this body and the abutting face of the analytical instrument. An additional seal may be formed between the connecting portion of the body and the cap. Also, the instrument itself may establish additional sealing, as needed to provide an inert analysis chamber surrounding the part of the central portion of the sample to be analyzed, for example formed into plasma by impinging laser or electrical energy.

Further embodiments of the invention are directed to a method for analyzing a sample, using a sample isolation device as described above. According to representative methods, one or more conventional steps, such as those associated with sample preparation, may be simplified or even omitted.

Yet further embodiments of the invention are directed to an analytical instrument comprising a removable sample isolation device as described above. The sample isolation device may be used for positioning the sample both rotationally and spatially in a sealed environment within the instrument. Rotational positioning allows the sample to be aligned with a source of energy, such as a laser beam or spark. Spatial positioning allows the sample to be positioned tangent to the sample plane of the instrument, independent of its rotational position.

Still further embodiments are directed to a device for isolating a sample, having a body comprising both a connecting portion and a cap. The connecting portion is configured for connecting in an instrument sealing engagement with an abutting face of an analytical instrument. This instrument sealing engagement may result from a fixed (e.g., non-moveable) relationship with respect to the analytical instrument, such as a fixed connection between the connecting portion and the instrument. The cap is configured for establishing a body sealing engagement with the connecting portion. This body sealing engagement may be achieved with a moveable connection between the cap and the connecting portion. The sample may be spatially positioned, at least in part, with an internal positioning element, for example within the connecting portion.

According to particular embodiments of these devices, methods, and analytical instruments, the laser or electrical energy is used in a LIBS or OES analytical method.

According to other particular embodiments of these devices, methods, and analytical instruments, the sample is a wire of given gauge, and typically a metal wire comprising multiple metallic elements.

These and other embodiments will become apparent from the following detailed description.

Figure 1:
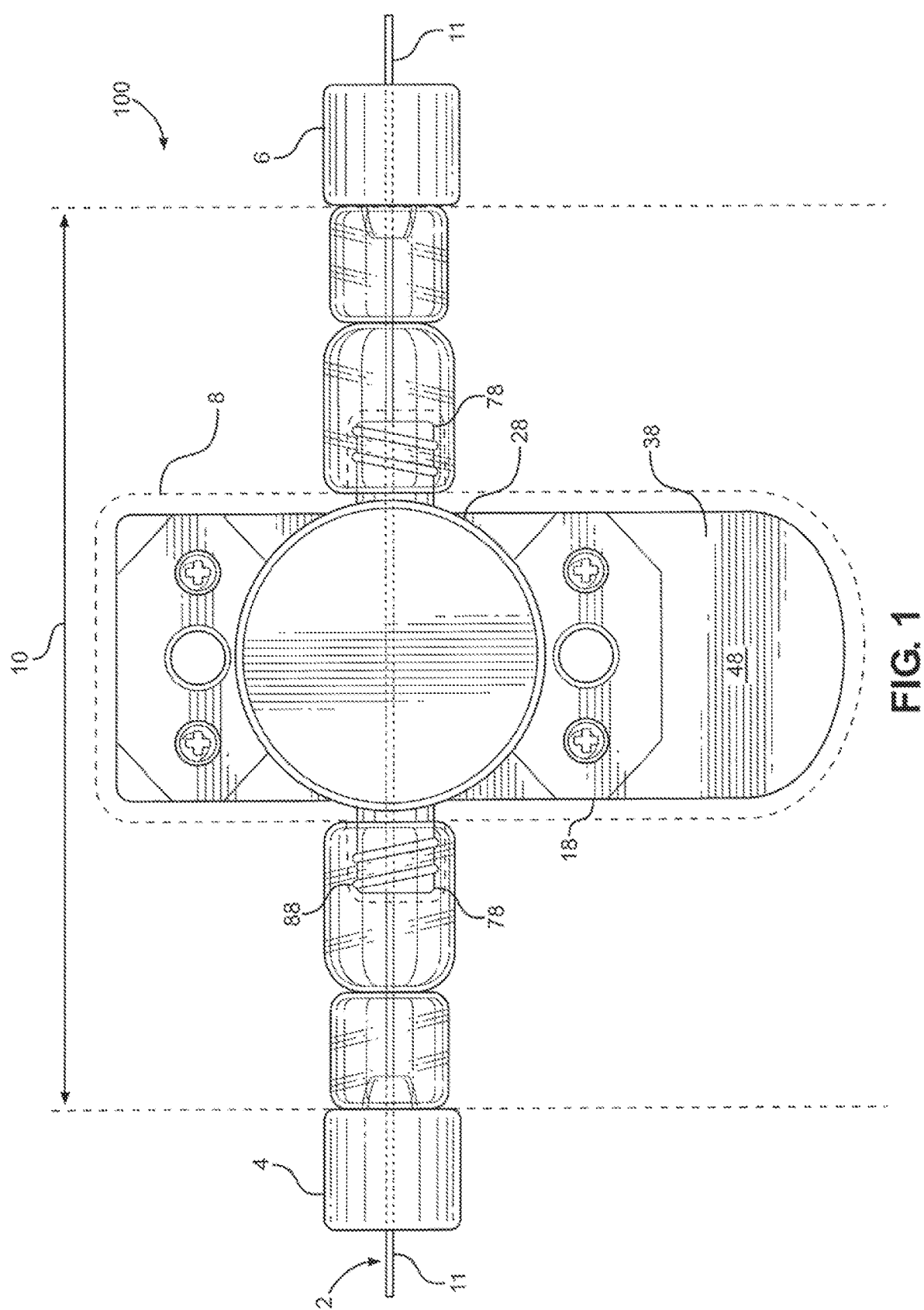
FIG. 1 illustrates a front view of a device for isolating a sample.

The figures should be understood to present an illustration of an embodiment of the invention and/or principles involved. As would be apparent to one of skill in the art having knowledge of the present disclosure, other devices, methods, and analytical instruments will have configurations and components determined, in part, by their specific use. Like reference numerals refer to corresponding parts throughout the several views of the drawings.

DETAILED DESCRIPTION OF EMBODIMENTS

As noted above, embodiments of the invention relate to devices that confer advantages in analytical methods, with the devices being particularly suitable in the spectroscopic analysis of the composition of metal wire samples, for example using laser induced breakdown spectroscopy (LIBS) or optical emission spectroscopy (OES) or like methods. Other embodiments relate to methods of using the devices, as well as analytical instruments comprising the devices, which devices may be removable for insertion of a sample and connectable to an abutting face of the device in a sealing manner, for analysis of the sample.

FIG. 1 illustrates a representative device 100 for positioning and isolating a sample 2, such as a wire (e.g., may include a solid or a stranded wire) or other elongated solid, and particularly a sample comprising or consisting of metal (e.g., comprising at least about 90% by weight metal). The sample elongated solid may be of any suitable dimension and may be flat or cylindrical or have a circular diameter. The elongated sample has dimensions to traverse the sample end attachments as further described with respect to the embodiment of FIG. 1. Device 100 comprises first and second sample end attachments 4, 6 that are connected to a central body 8, which includes a connecting portion 18 configured to align, and sealingly engage, with the abutting face of an analytical instrument. In this manner, a portion of the sample, particularly central portion 10 between sample end attachments 4, 6, may be properly positioned for analysis in a sealed and preferably inert environment. Body 8 further includes rotatable cap 28, which can be the specific element of the body to which sample end attachments 4, 6 are connected. Body 8 can further include fittings 78, for example having threads 88 at their outer ends, to establish a sealing connection with sample end attachments 4, 6. The turning of cap 28 can allow the angular position of the sample to be adjusted, relative to connecting portion 18 and therefore also relative to an analysis chamber, in which part of the central portion of the sample is housed when device 100 is sealed in the analytical instrument. Device 100 therefore allows central portion 10 to be rotationally positioned, if necessary, in alignment with applied energy, such as laser energy or electrical potential, as well as spatially positioned, for example tangent to a sample plane of the analytical instrument.

Representative sample end attachments 4, 6 advantageously connect directly to the sample (e.g., by clamping down on the sample outer surface upon tightening) such that sealing engagement with the analytical instrument is established partly through seals formed at junctions between end attachments 4, 6 and respective points or locations of sealing contact with the sample. That is, first and second sample end attachments 4, 6 are configured, in conjunction with sample 2, to provide respective first and second seals of a sealed environment containing central portion 10. First and second sample end attachments 4, 6 may more specifically be configured to provide a sealed analysis chamber that houses (e.g., surrounds or contains) the particular part of central portion 10 that is analyzed (e.g., subjected to laser energy or electrical potential). The first and second seals are formed at opposite ends of central portion 10 where end attachments 4, 6 engage with sample 2. Any type of end attachments, for example compression fittings, that can form seals with the outer surface of the sample, and thereby have the capability of isolating central portion 10 in one environment (e.g., an inert environment), which differs from a second environment (e.g., an ambient environment) to which outer portions 11 are exposed, are applicable. Compression fittings can suitably provide sealing engagement with cylindrical elongated samples (e.g., wires) of varying diameters. A particular type of end attachment, for example, is a tuohy borst adapter that has gained widespread use in the medical field, especially for catheters. Other known adapters would be understood by one of skill in the art based on the present disclosure to be useful in embodiments of the present disclosure.

Figure 2:
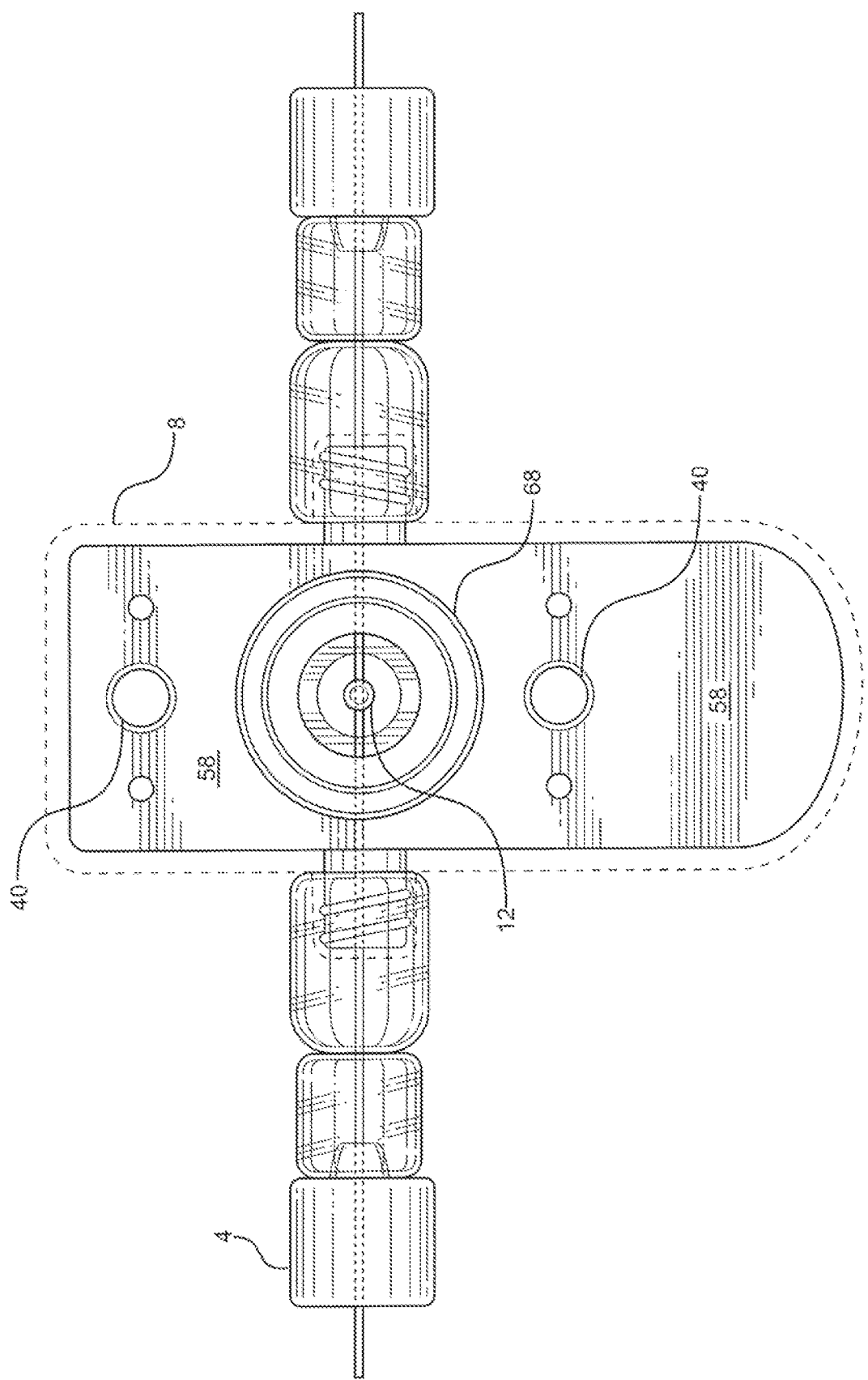
FIG. 2 illustrates a rear view of the device depicted in FIG. 1.

Both FIG. 1 and FIG. 2 illustrate first and second sample end attachments 4, 6 being affixed to opposite sides of body 8, and in particular opposite sides of cap 28. End attachments 4, 6 may be formed predominantly of a hard plastic, although they will also typically include a softer material, such as an elastomer (e.g., rubber) or a silicone polymer that may be in the form of a ring or gasket, to provide a sealing surface. Body 8, including both connecting portion 18 and cap 28, may be formed predominantly or entirely of metal, such as stainless steel. As further illustrated in both FIG. 1 and FIG. 2, connecting portion 18 may include, or be in the form of, a plate 38. FIG. 1, in particular, provides a view of front surface 48 of plate 38, corresponding to a side of connecting portion 18 on which cap 28 is disposed. FIG. 2 provides a view of rear surface 58 of plate 38, corresponding to the opposite side of connecting portion 18, from that side on which cap 28 is disposed. Connecting portion 18 of body 8 is configured to provide, in the analytical instrument in which device 100 is used, a third seal for isolating central portion 10 in the sealed environment as described above, which is formed partly by first and second seals provided by sample end attachments 4, 6 in conjunction with sample 2. In particular, this third seal may be established between rear surface 58 of plate 38 and an abutting face of the analytical instrument, such as a LIBS instrument or OES instrument. An additional seal may be formed between connecting portion 18 of body 8 and cap 28, or more particularly, between moveable parts and their abutting surfaces that allow cap 28 to be rotated to some extent with respect to connecting portion. Any of the various "seals" described herein refer to contacting surfaces, e.g., between end attachments 4, 6 and sample 2 or between rear surface 58 of plate 38 and an abutting instrument face. In general, any of such "seals" should be sufficient to sufficiently isolate a desired inert environment of an analysis chamber from an ambient environment outside this chamber, at least when the pressures in these two environments are the same or approximately the same.

Figure 3:
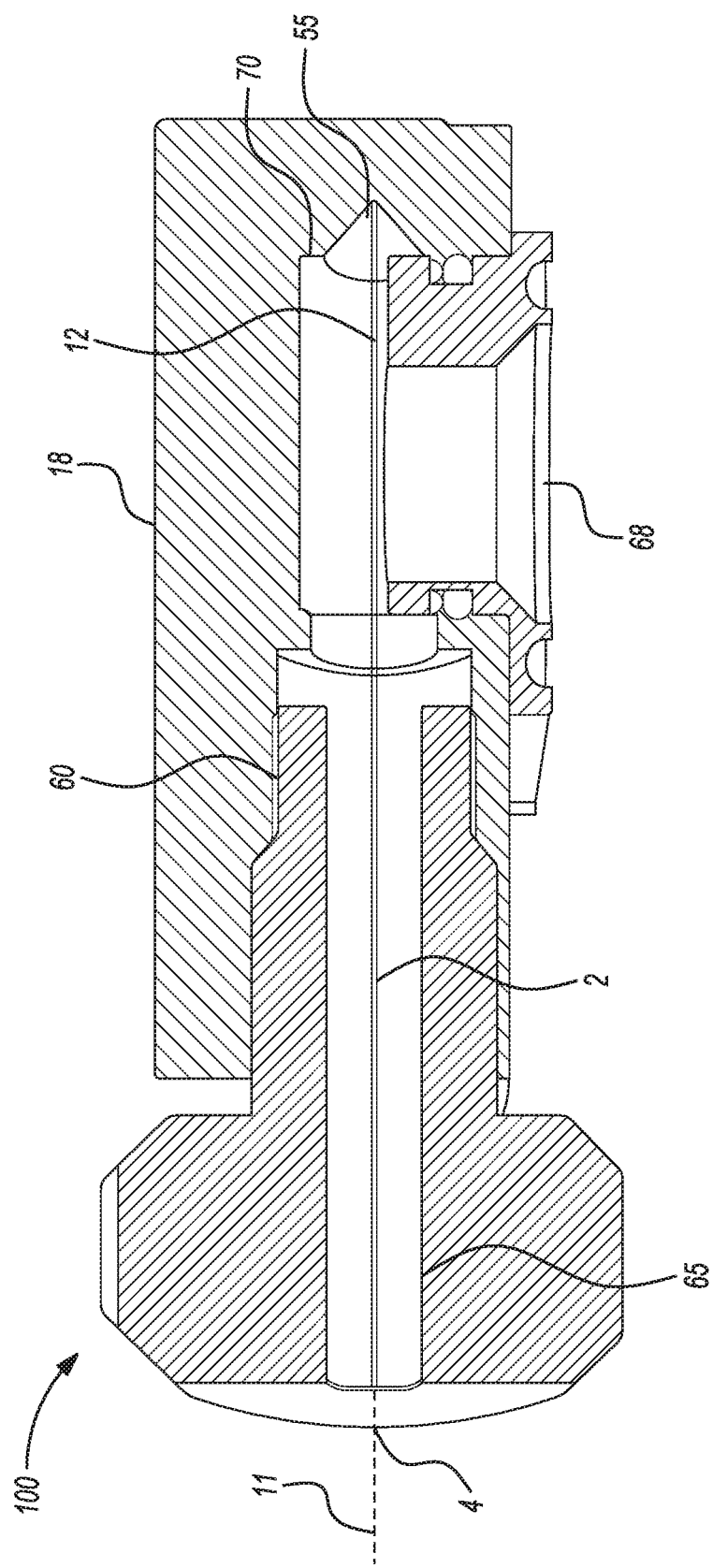
FIG. 3 illustrates a side, cut-out view of another device for isolating a sample.

Some embodiments of the invention may only include a single embodiment of end attachment (either 4 or 6) in conjunction with a receptacle within body 8 that receives sample 2 and holds in the proper position for testing. The "one-sided" embodiment described thus has only one sample/end attachment seal with the external environment to maintain. Such a receptacle may include a depression, fitting, or other type of receiving receptacle compatible with the form of the sample 2. For example, FIG. 3 depicts an alternative sample isolation device, in which end attachment 4 may be the only seal of an analysis chamber environment that is formed with sample 2. As shown, sample 2 may optionally protrude from end attachment 4 to expose outer portion 11, in a manner similar to that with respect to end attachments 4,6, as shown in FIGS. 1 and 2. In the embodiment of FIG. 3, it is cap 28 that may be configured to provide sealing engagement with the sample. However, it is also possible for sample 2 to be retained completely within an interior, elongated cavity 65 of cap 28, such that no end attachment with sample 2 is needed and no seal is formed between sample 2 and any portion of the device. Rather, in this case, sealing may be achieved by virtue of the configuration of abutting surfaces of parts of the device itself, which parts may, for example, be appropriately machined to provide the seals. Accordingly, the sample may have only a single point of entry into the device 100 or no points of entry, in the case of the sample being entirely contained within sealing surfaces of connecting portion 18 of body 8 and cap 28. In either case, the construction is thereby simplified.

Figure 4:
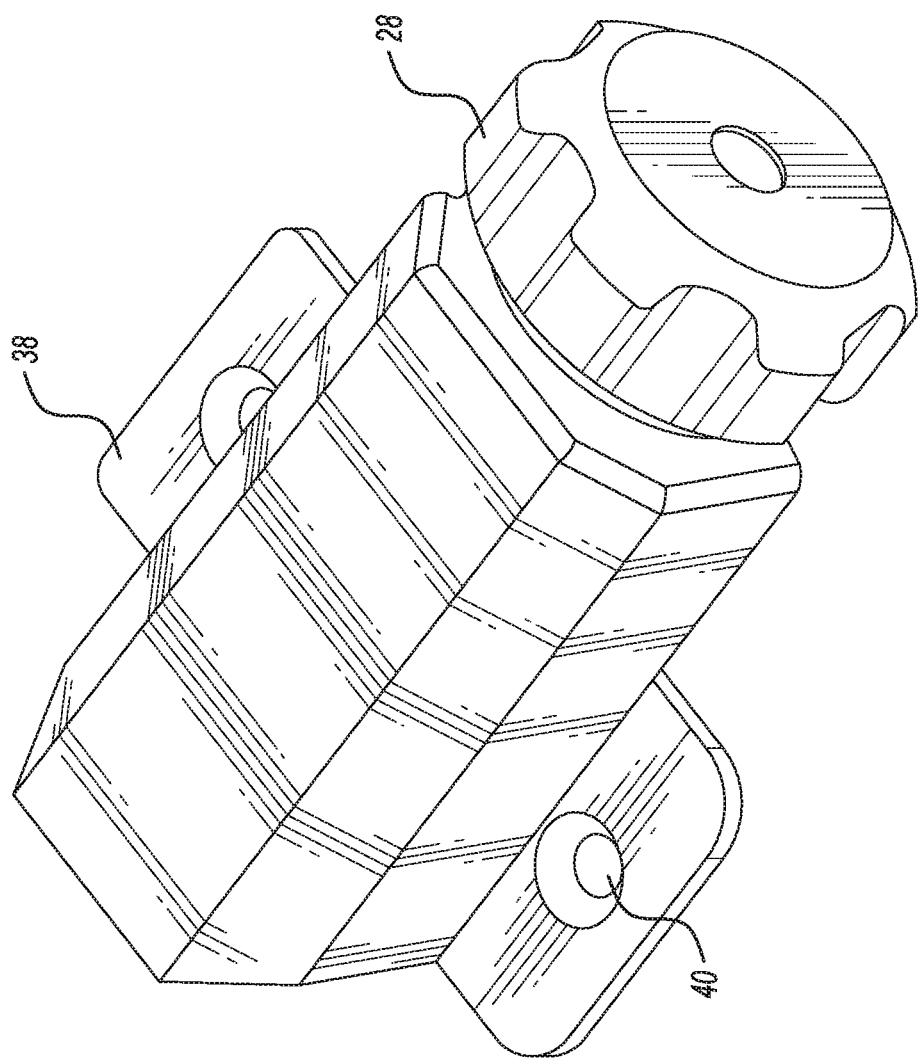
FIG. 4 illustrates a top view of the device depicted in FIG. 3.

The embodiments depicted in FIGS. 3 and 4 may therefore be configured to provide an instrument sealing engagement, between connecting portion 18 and the abutting face of the analytical instrument, in addition to a body sealing engagement, between cap 28 and connecting portion 18. The instrument sealing engagement refers a seal between parts affixed to each other, whereas the body sealing engagement refers to a seal between parts moveable with respect to each other. In the case of the latter seal, a sealing interface 60, such as a gasket or other interfacing/packing structure (e.g., made of plastic or rubber) may be used between the sealing surfaces to provide an effective seal yet allow relative motion. As described above, cap 28 itself may be used to sealingly engage sample 2 at an open end of cap 28, through which sample 28 projects externally to outer portion 11. Alternatively, cap 28 may have a closed end to contain sample 2 entirely within a sealed environment established by the instrument sealing engagement and the body sealing engagement. Whether or not an outer portion of sample 2 protrudes from the device, the elimination of at least one of the end attachments 4, 6, relative to the embodiments depicted in FIGS. 1 and 2 may be effectively compensated for by the use of internal positioning element 55 to achieve alignment of sample 2 with respect to connecting portion 18 and consequently with respect to the analytical instrument itself.

As shown in FIG. 3, interior, elongated cavity 65 within cap 28 is used to direct sample 2 over interior section 68 that is removed from plate 38, thereby allowing exposure of part 12 of sample 2 to impinging energy when device 100 is mounted on an analytical instrument. Additionally, elongated cavity 65 directs sample 2 toward internal positioning element 55, which is shown as an indentation at peripheral wall 70 of interior section 68, which may define a wall of analysis chamber 20 (described below in reference to FIG. 5). Other types of positioning elements may likewise be used to orient sample 2 correctly within this chamber, such as projections from peripheral wall, which may likewise serve to accurately guide and position an end of sample 2. Advantageously, positioning element 55 can overcome the need for an end attachment (4 or 6) that is used in the embodiments of FIGS. 1 and 2. The use of a closed end of cap 28 and elongated cavity 65, in combination with connecting portion 18, can completely retain sample 2 within a sealed environment of the analysis chamber and thereby overcome the need for another end attachment (4 or 6).

As more clearly illustrated in the view of FIG. 2, an interior section 68 is removed from plate 38 to expose part 12 of sample 2 within central portion 10 that is analyzed (e.g., converted into plasma) by exposure to impinging energy, such as a laser beam or electrical spark. Importantly, only a small region of sample 2 is exposed to the energy such that sample 2 is not sacrificed and is still useable after completion of the testing. For example, a laser beam may be focused to a spot size of about 15 µm spot on sample 2, and an OES spark may include a spot of about 3-4 mm across. Also, one or more optical elements may focus a laser beam to a point in the sample plane in part 12 with sufficient energy to produce the desired plume of plasma. In the present example, as the distance increases away from the focal point the energy in the laser beam is dispersed to a level that is insufficient to produce plasma thus limiting the risk of contaminating spectral signatures from cap 28 or other structures. In an alternative example using an electrical spark to create the plasma for OES, device 100 may include one or more metal "touch points" with sample 2 in analysis chamber 20 (described below in reference to FIG. 5) to provide the necessary grounding to create the spark.

Figure 5:
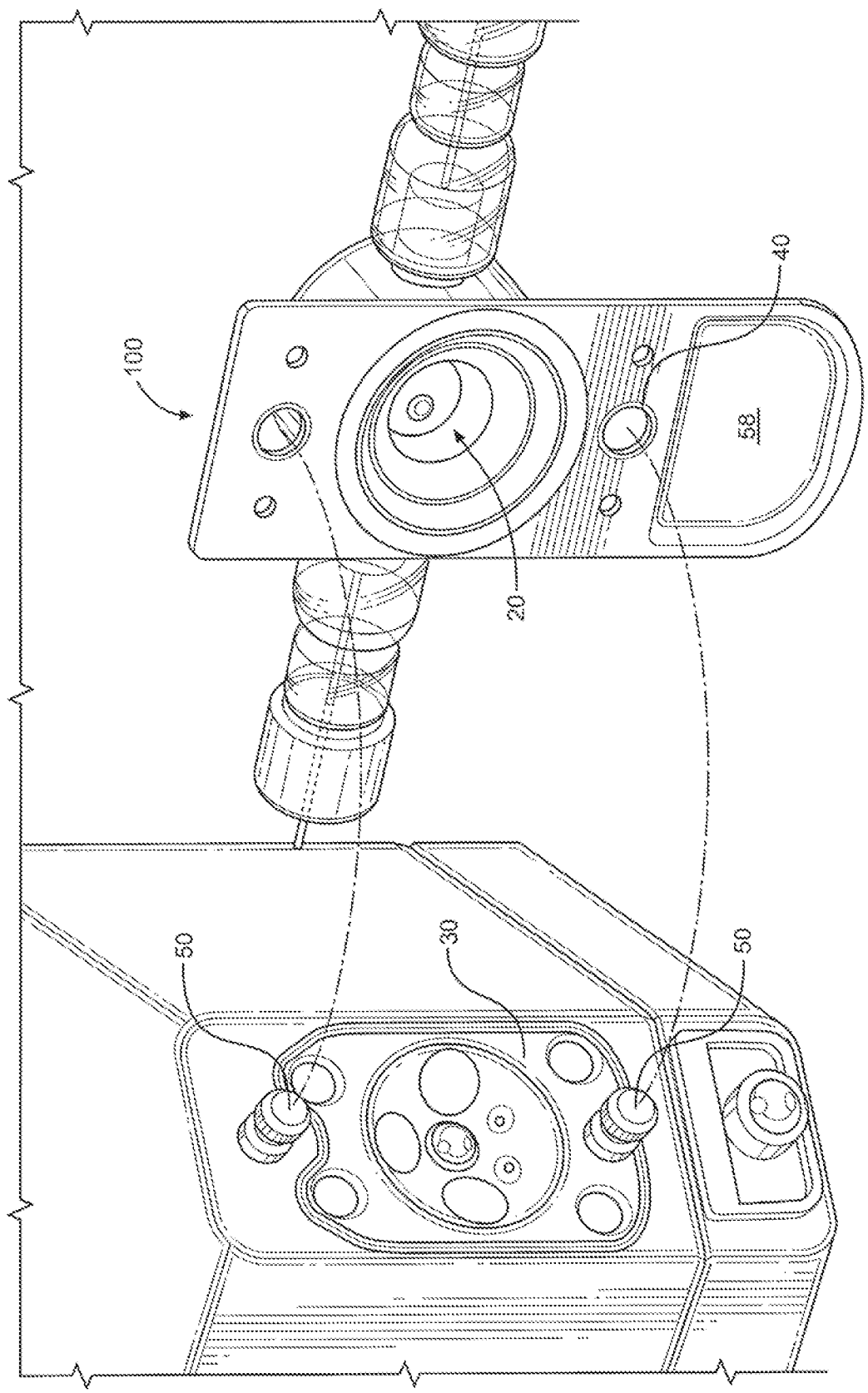
FIG. 5 illustrates a rear surface of a plate of the device according to the embodiment depicted in FIG. 1, and the alignment of this device with an abutting face of an analytical instrument.

Therefore, it can be seen that interior section 68, together with cap 28, defines an analysis chamber that houses exposed part 12 of sample 2. FIG. 5 illustrates how analysis chamber 20 is further defined by the plane of a front or abutting face 30 of the analytical instrument, when in use. FIG. 5, in particular, illustrates the alignment of device 100 with other parts of the analytical instrument, and the ability of rear surface 58 of device 100 and abutting face 30 of the analytical instrument to provide a third seal for forming the desired sealed and inert environment. For this purpose, connecting portion 18 of body 8 of device 100 can include at least one, and preferably at least two (often only two), connection elements 40 for alignment with abutting face 30. In the particular embodiments of FIGS. 1, 2, 4, and 5, these connection elements 40 are shown as orifices in connecting portion 18 that are configured to accept respective ball seals 50, mounted on abutting face 30.

Figure 6:
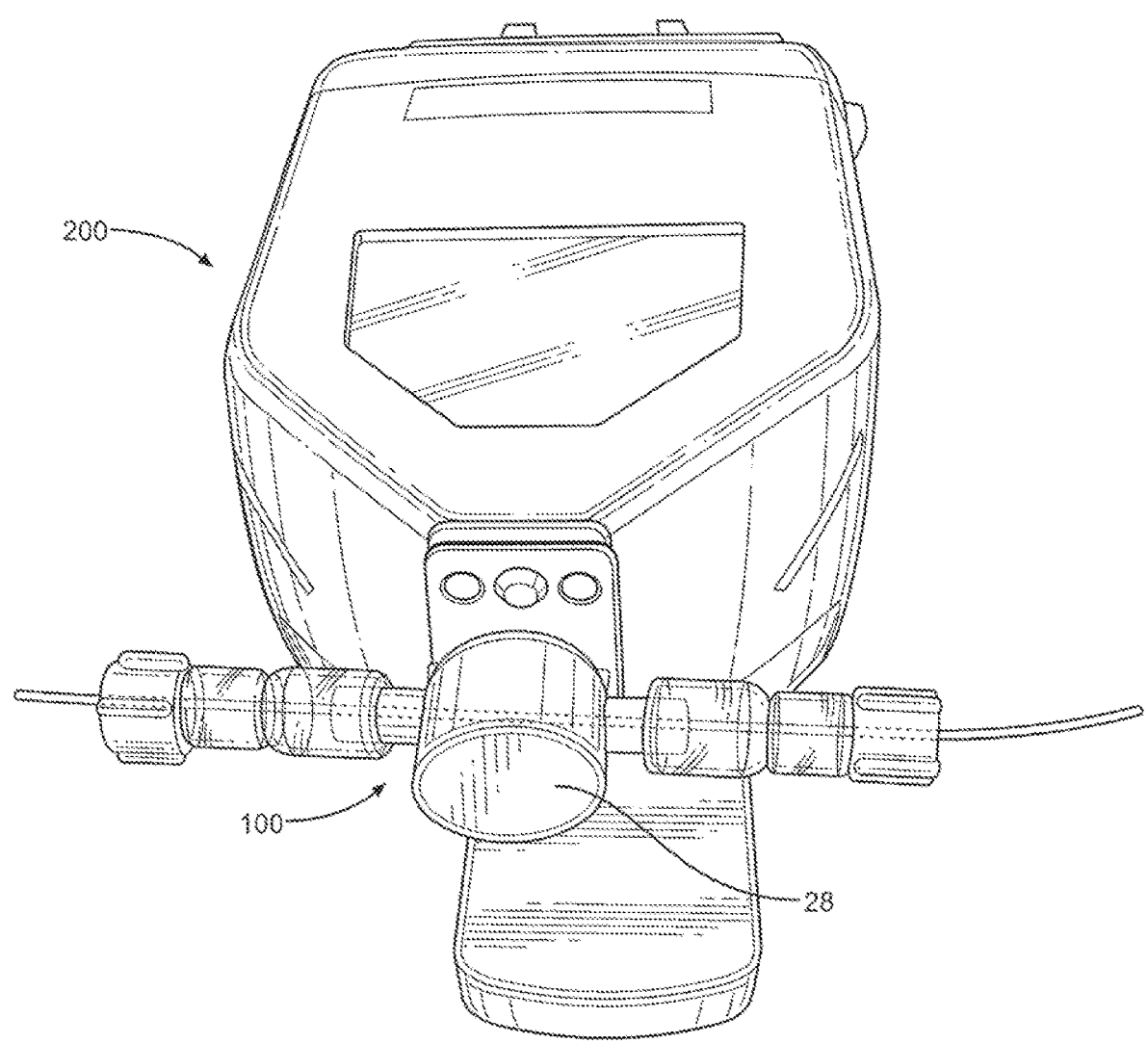
FIG. 6 illustrates an analytical instrument with the device according to the embodiment depicted in FIG. 1 connected in a sealing manner, as would be appropriate for performing the intended analysis.

FIG. 6 illustrates analytical instrument 200 (e.g., LIBS instrument or OES instrument) having sample isolation device 100, as described with respect to the embodiment of FIGS. 1 and 2, mounted on the nose of this instrument, thereby sealing the environment in which central portion 10 of the sample wire is disposed. An inert atmosphere may be provided in the environment in which central portion 10 of the sample wire is disposed. Preferably, central portion 10 of the sample wire is under an inert atmosphere during sample analysis. In this mounted position, cap 28 can be turned to align the sample, for example in the path of a laser beam. Also, analytical instrument 200 may be configured as a portable device with a hand held form factor that enables remote testing at work sites or other locations impractical for testing with bench top type instruments.

In some embodiments, analytical instrument 200 can be configured with a micro-camera as well as a display screen used to assist in alignment of the sample and the applied energy used to conduct the analysis. Software or firmware associated with analytical instrument 200 may display a target reticle on the display screen indicating the focal point of the laser beam as well as the image of the sample taken by the micro-camera. That is, upon alignment of sample isolation device 100 in the analytical instrument, for example at abutting surfaces 58, 30 as described above, the device may advantageously be configured to rotationally position the sample, at a target location tangent to the sample plane. The device may likewise be configured to provide an inert environment enclosed by at least a first sample end attachment, the body of the device, and the analytical instrument. Within this environment, the analytical instrument may be used to subject part of the sample to laser or electrical energy. Accordingly, as illustrated in FIG. 6, the analytical instrument comprises removable sample isolation device 100, having features as described above, for example first and second sample end attachments connected to a body, in addition to rotatable cap 28. The rotatable cap advantageously allows adjustment of an angular position of the sample, relative to the connecting portion of the body. This connecting portion is aligned with the analytical instrument, or at least configured for such alignment (when the device is removed), for example through the use of mating connection elements. When alignment is established, for example during use of the instrument, the central portion of the sample is sealed in the enclosed environment as described above, while preferably being positioned tangent to the sample plane of the instrument, which coincides generally with the abutting face at which the device is joined to the instrument.

The sample isolation devices described herein may advantageously be used with analytical methods involving little or no sample preparation, and/or the complete elimination of conventional sample preparation steps, including surface preparation. However, some surface preparation such as, for example polishing or grinding to remove surface contamination and achieve a bare metal surface, may be desirable in the case of metallic samples containing carbon (e.g., low carbon steel welding wire). Representative methods may comprise guiding the sample through first and second sample end attachments of a sample isolation device, or otherwise positioning the sample within the device, such as within an elongated cavity within the cap, for example as described above. Such a receptacle may take the place of an end attachment that receives the sample to hold in proper position. In embodiment utilizing sample end attachments, these may be tightened to the sample at opposite ends of the central portion that is to be maintained in the sealed environment. For example, in a specific embodiment, a user of the analytical device for determining a wire composition simply feeds a section of the wire through two Tuohy borst adapters joined to opposite ends of the device and then tightens these adapters to create an air seal around the central section between them. Once the device, or "nose" of the analytical instrument, is aligned with the abutting face, a seal is created and may be used to isolate this central section of the sample in an inert (e.g., argon) atmosphere. Accordingly, analytical methods may comprise establishing an inert environment in an analysis chamber that houses a part of the central portion of the sample. With reference to the description of the device features above, this analysis chamber may be defined by the removed, interior section of the plate, the cap, and a plane of the abutting face of the analytical instrument.

Alignment of the sample isolation device with the abutting face of the analytical instrument, which may involve positioning the rear surface of the plate against the abutting face of the analytical instrument as described above, allows for proper spatial positioning of the sample relative to the instrument. In this manner, the central portion of the sample may be advantageously positioned and sealed in an environment enclosed by the first and second sample end attachments, the body of the sample isolation device (which may include both a cap and connection portion in a sealed configuration but moveable with respect to each other), and the analytical instrument. Accordingly, the sample is prepared in an efficient manner, for a subsequent step of subjecting part of the sample to laser or electrical energy. Prior to this subsequent step, the angular position of the sample may optionally be adjusted, by turning the cap, to align with the direction of the applied energy. Also, whereas sealing and/or purging with an inert gas such as argon of the sample environment is generally required prior to this subsequent step, the order of other method steps can be changed. For example, alignment of the body of the sample isolation device with the analytical instrument may be performed before or after tightening of the sample end attachments. According to one embodiment, a rear plate surface of the body may be aligned with, and sealed against, the abutting face of the analytical device, prior to tightening of the sample end attachments to form the sealed environment. This may allow for initial purging of this environment with an inert gas such as argon, through the un-tightened sample end attachments. In some embodiments, the body may include one or more devices that provide a one way direction of flow enabling air to escape during purging. Such devices may include what are generally referred to as a purge valve; check valve; one way valve; non-return valve or other name typically used in the related art. Suitable inert gases will become apparent to those of skill in the art based on the present disclosure.

Overall, aspects of the invention are directed to sample isolation devices, analytical instruments, and methods for sample analysis, which may be associated with greatly simplified sample preparation steps, compared to conventional steps. Those having skill in the art, with the knowledge gained from the present disclosure, will recognize that various changes can be made to the disclosed apparatuses and methods in attaining these and other advantages, without departing from the scope of the present invention. As such, it should be understood that the features described herein are susceptible to modification, alteration, changes, or substitution. The specific embodiments illustrated and described herein are for illustrative purposes only, and not limiting of the invention as set forth in the appended claims.

What is claimed is:

1. A device for isolating a sample, the device comprising:
    a first sample end attachment connected to a body,
    a rotatable cap that allows adjustment of an angular position of the sample, relative to a connecting portion of the body, and
    a second sample end attachment connected to the body,
    wherein the first and second sample end attachments are configured, in conjunction with the sample, to provide respective first and second seals of a sealed environment containing a central portion of the sample,
    wherein the connecting portion of the body is configured to provide, in an analytical instrument, a third seal of the sealed environment for isolating the central portion of the sample in an inert environment,
    wherein the connecting portion of the body includes a plate and the third seal is established between a rear surface of the plate and an abutting face of an analytical instrument,
    wherein the connecting portion of the body includes at least two connection elements for alignment with the abutting face of the analytical instrument, and
    wherein the two connection elements are orifices configured to accept ball seals on the abutting face of the analytical instrument.

2. The device of claim 1, wherein the first and second sample end attachments are affixed to opposite sides of the body.

3. The device of claim 1, wherein the first and second sample end attachments are tuohy borst adapters.

4. The device of claim 1, wherein the connecting portion of the body includes a plate that, together with the cap, houses a part of a central portion of the sample.

5. The device of claim 1, wherein the first and second seals are formed through tightening of the first and second sample end attachments to opposite ends of the central portion.

6. The device of claim 1, wherein the analytical instrument is a laser induced breakdown spectroscopy (LIB S) instrument or an optical emission spectrometry (OES) instrument.

7. The device of claim 1, wherein an interior section, which is removed from the plate, together with the cap and a plane of the face of the analytical instrument, define an analysis chamber that houses a part of the central portion of the sample.

8. The device of claim 1, wherein at least a central portion of the sample is cylindrical.

9. The device of claim 1, wherein the sample is a metal wire.

10. A method for analyzing a sample, the method comprising:
    guiding the sample through the first and second sample end attachments of the device of claim 1;
    tightening the first and second sample end attachments to the sample, at opposite ends of a central portion of the sample; and
    aligning the device with a face of an analytical instrument, wherein the central portion of the sample is sealed in an environment enclosed by the first and second sample end attachments, the body of the sample isolation device disposed between the first and second sample end attachments, and the analytical instrument.

11. The method of claim 10, further comprising adjusting an angular position of the sample to align with laser or electrical energy emitted from the analytical instrument.

12. The method of claim 11, wherein the plate and the rotatable cap are joined to the first and second sample end attachments, wherein the aligning of the device comprises positioning a rear surface of the plate against an abutting face of the analytical instrument, and wherein the adjusting of the angular position of the sample comprises turning the rotatable cap.

13. The method of claim 12, further comprising establishing an inert environment in an analysis chamber that houses a part of the central portion of the sample, wherein the analysis chamber is defined by a removed, interior section of the plate, the cap, and a plane of the abutting face of the analytical instrument.

* * * * *